United States Patent [19]

Fukuoka

[11] Patent Number: 5,488,440
[45] Date of Patent: Jan. 30, 1996

[54] CLAMP TYPE SCREW LOOSENING PREVENTION MECHANISM FOR GLASSES

[75] Inventor: Mikihito Fukuoka, Sabae, Japan

[73] Assignee: Fukuoka Seimitu Kabushiki Kaisha, Fukui, Japan

[21] Appl. No.: 301,402

[22] Filed: Sep. 8, 1994

Related U.S. Application Data

[63] Continuation-in-part of Ser. No. 907,045, Jul. 1, 1992, abandoned.

[30] Foreign Application Priority Data

Feb. 4, 1992 [JP] Japan .................................... 4-54375

[51] Int. Cl.$^6$ ................................................. G02C 5/00
[52] U.S. Cl. ....................... 351/141; 351/140; 351/153
[58] Field of Search ................................. 351/153, 141, 351/140; 411/277, 280, 335, 436, 437

[56] References Cited

U.S. PATENT DOCUMENTS

| | | | |
|---|---|---|---|
| 964,239 | 7/1910 | Wegener | 351/141 |
| 1,150,114 | 8/1915 | Hays | 351/141 |
| 2,256,846 | 9/1941 | Lohmann | 351/141 |
| 2,561,433 | 7/1951 | Uhle | 351/140 |
| 2,991,695 | 4/1961 | Jones | 351/141 |
| 3,403,958 | 10/1968 | Gross | 351/153 |
| 4,776,685 | 10/1988 | Jeunet | 351/141 |

FOREIGN PATENT DOCUMENTS

4-315123  11/1992  Japan ..................................... 351/141

Primary Examiner—William L. Sikes
Assistant Examiner—Hung Xuan Dang
Attorney, Agent, or Firm—Staas & Halsey

[57] ABSTRACT

This invention relates to a clamp type screw loosening prevention mechanism for eyeglasses parts which enables tight clamping of the end portion of the threaded rod of male screw toward the axis utilizing ingenious configulation of the female screw, which can effectively prevent loosening of all screwed parts such as temple hinge, rim closing block, pad, top rim, etc. The screw loosening prevention mechanism of the present invention consists of providing split cone projection on the exit side of the metal eyeglasses parts to be screw joined or fixed through whose piercing hole the end of the threaded rod of the male screw can come out, and by providing to the inside wall of the piercing hole which goes into this split cone projection the female screw thread which gradually reduces in inside diameter as the exit end approaches, the end part of the male screw threaded rod screwed therein is tightly clamped toward the center of axis by the spring-back resiliency of the split cone projection.

7 Claims, 6 Drawing Sheets

CLAMP TYPE SCREW LOOSENING PREVENTION MECHANISM FOR GLASSES

This application is a continuation-in-part of application Ser. No. 07/907,045, filed Jul. 1, 1992, now abandoned.

BACKGROUND OF THE INVENTION

1. Field of the Invention

This invention relates to an improvement of the screw fixing mechanism for eyeglasses parts, and more particularly to a clamp type screw loosening prevention mechanism for eyeglasses which prevents unwelcome loosening of the screwed part in glasses by an ingeneous design of the configuration of the female screw which enables the clamping of the threaded male screw rod at the end portion toward the center of the axis.

2. Description of the Related Art

As it is widely known, the screwed parts of eyeglasses are very easy to become loose. For example, hinge joint between the temple and front frame of eyeglasses are often repeatedly opened and closed when wearing the glasses in the morning or taking off the glasses at night, as well as when the normal glasses are folded and changed to the sunglasses when going out. Whenever the glasses are repeatedly taken on and off, the male screw which fastens the temple's hinge joint receives the effect of gradual loosening by the turn friction which accompanies opening and closing of the temple, thus becoming loose without becoming noticed to the extent that the screw almost come out of the knuckle of the hinge joint, or loosened to the point of being shaky by the gradual loosening from the incessant small vibration when traveling by an airplane or train.

Then, why was the screw fastening mechanism of the eyeglasses of the prior arts were easy to become loose? To search for the reason, it seems that the greatest cause of the problem is the lack of practical mechanism for preventing the loosening of the screw suitable for eyeglasses because all parts except the lenses of the eyeglasses worn on human face are thin and narrow, and the male screws capable of using for fastening and joining purpose were minute.

Of course, proposals has so far been made which attempts to prevent the loosening of the screw fastened portion. The large numbers of them depended on the complex combination of a number of tiny precision parts. Their cost was high because they had to fit tight in the three dimensional narrow space of the delicate configuration of parts of an eyeglasses frame. Moreover, the assembly process became extremely cumbersome and inefficient, and the appearance was not stylish without refinement. Therefore, according to the recent tastes of the eyeglasses market where fashonable, slim design was favored, such proposals were not welcome.

A simple kind of proposals relating to the screw loosening prevention mechanism existed, but it merely taught easy method of coating a part or whole of the threaded rod of male screw with synthetic resin material thereby increasing the friction resistance between the male and female screw thread in the screw tightened condition. The problem with this solution was that synthetic resin coating could easily be worn out where the short and thin tiny eyeglass screw's threded rod part is coated with such and where the screw joint is repeatedly opened and closed such as hinge joint connecting temple, resulting in the loosening of the screw.

Even where the screw is rarely moved, e.g. rim closing block which enfold the lense, if some reason arise so that the lense needs to be replaced, when the male screw is unscrewed the synthetic resin coating will be removed from the threaded rod and the screw cannot be reused necessitating a replacement.

The present invention was made in view of the above mentioned shortcomings of the prior arts' screw loosening prevention mechanism, and it is an object of this invention to provide a screw loosening prevention mechanism for eyeglasses parts which does not loosen unwittingly because the end portion of the male screw rod becomes firmly clamped and in immovable condition after having screwed on properly, and using a minute screw in only thin and narrow space obtainable for eyeglasses screw fixing parts, easily and efficiently process screw fixing of parts.

Another object of the present invention is to provide a screw loosening prevention mechanism for eyeglasses which has simple structure and a few parts, capable of manufacturing at a low cost.

Still another object of the present invention is to provide a screw loosening prevention mechanism which is structurally strong, highly durable, and fully capable of enduring heavy duty use and repeated screwing and unscrewing.

Further object of the present invention is to provide a screw loosening prevention mechanism for eyeglasses which contributes to the improvement of the eyeglasses design by blending into the thin and narrow eyeglasses screw fixing space and which is capable of doing the screw fixing easily.

SUMMARY OF THE INVENTION

According to the present invention, a clamp type screw loosening prevention mechanism for eye glasses parts is provided which comprises at least two eyeglasses parts each of which has a piercing hole having the aligned axis, which parts are to be joined to each other with a screw going through the piercing holes, and a male screw which pierces through said glasses parts and screw-joins these eyeglasses parts; and characterized in that at the outside end surface of said eyeglasses parts where the end of said male threaded screw rod can come out, a split cone projection is formed, and at the part of the inside wall of the bored hole which goes through the split cone projection, female screw thread is provided which gradually reduces in inside diameter as the exit end of the hole approaches, and the end part of said male threaded screw rod which is screwed into the piercing hole from the opposit side of the split cone projection is firmly joined to said female screw thread inside the split cone projection in a clamped condition by the spring-back resiliency of said female threaded split cone projection.

The eyeglasses parts and male-screw which is used for this invention are made of metal materials such as German silver, Nickel-Cromium alloy, stainless steel, which are generally used for conventional eyeglasses parts and have resiliency characteristic to metal materials, the end part of the male screw's threaded rod which is screwed through inside the split cone part of the eyeglasses parts are firmly clamped toward the center axis by the spring-back resiliency of said split cone part.

Therefore, it is possible to utilize the present invention to almost all parts of eyeglasses to be screw mounted or fixed. For example, temple hinge, rim closing block, pad, hood, brace bar, other accessaries and attachments for eyeglasses can be screw mounted utilising the present invention. The male screw that fixes these parts maintains the strong bonding with the split cone part that is formed on the glasses parts, and unlike the conventional products, there is no problem of loosening unwittingly maintaining stable trouble free condition for a very long period.

DETAILED DESCRIPTION OF THE PREFERRED EMBODIMENTS

Reffering now to the drawings, FIGS. 1~5, shows the temple hinge according to tile first embodiment of the present invention. In these figures, numeral 1 designates a hinge housing which comprises temple hinge together with plug hinge piece 2 and male screw 3. The hinge housing 1 is made of German silver and has the shape of substantially triangular braze bonding block 10 on a side of which two knuckle plates 10a, 10b are formed with a set plug-in distance projecting from the traiangular block. At the center of these knuckle plates piercing holes are provided. And one knuckle plate 10a's outside surface, split cone projection 11 which has four slits splitting tile projection. At the inside wall of this split cone projection, female thread 12' which gradually reduces in inside diameter as the exit end approaches. The female thread 12' is continuously threaded from the female thread 12 on the inside wall of the piercing hole of the knuckle plate 10a. In this way, the threaded rod end of the male screw which will be descrimbed later will screw through the split cone portion as it expand the exit opening diameter of the split cone projection. The other knuckle plate 10b's piecing hole is a clearance hole 13.

In the drawings, the numeral 2 designates a plug hinge piece also made of German silver which comprises the temple hinge of the first embodiment as a matching counterpart to the hinge housing 1. This plug hinge piece 2 also has a substantially triangular block shaped braze bonding portion 20 on whose one side is formed a plug in knuckle plate 20a projection which matches the thickness of the housing distance between said hinge housing's knuckle plate 10a and 10b. At the center of the knuckle plate 20a a clearance hole 21 is bored.

Finally, in the drawings the numeral 3 designates a male screw made of German silver which comprises temple hinge of the first embodiment as a fixed pin which joins the knuckle plate 20a plugged into the space formed by the knuckle plate 10a, 10b of said hinge housing 1. This male screw 3 conprises a slotted head 30 which is substantially larger in diameter than the threaded rod 31 which extends from the bottom surface of the head 30. On the circumference of the threaded rod 31 is formed a screw thread which is aligned to said female thread 12.

The temple joint according to the first embodiment is assembled by plugging the knuckle plate 20a of the plug hinge piece 2 into the housing distance between the knuckle plates 10a, 10b, and aligning the piercing holes of said knuckle plates 10a, 20a, 10b thus joined and piled in layers, threaded rod 31 of the male screw 3 is screwed through. In this way, the inside diameter of the female screw 12' inside the split cone 11 will be forcefully opened wider, and screwed into and pierced through threaded rod end 31' of the male screw 3 is tightly clamped toward the center axis by the spring-back resiliency characteristic of metal material which in this case is said split cone 11 made of German silver.

THE SECOND EMBODIMENT

Reffering now to the drawings of the second embodiment, FIG. 6~10 shows the rim closing block according to the second embodiment of the present invnention which holds eyeglasses lense securely inside the rim. The numeral 4 and 5 in the drawings each designates closing block piece and made of stainless steel. One of the closing block 4 is joined to the upper rim 7 at the outside surface of the cut ending portion by brazing. The other closing block 5 is joined to the lower rim 7 at the outside surface of the cut ending portion by brazing also. And at the upper surface of said closing block piece 4 joined to the upper rim 7's cut ending portion, a split cone projection 41 is formed with four split slots. A piercing hole 40 is bored through the center of the split cone projection, and at the center of the closing block piece 5 joined to the cut ending portion of the lower rim, an aligned piercing hole 50 is bored with the same axis. Said upper closing block piece 4 differs from the lower piece 5 in that the piercing hole 40 has a female screw thread 42 formed on the inside wall circumference, and at the inside wall circumference of the split cone part 41, the female screw thread 42' becomes gradually reduced in inside diameter as the exit end approaches. Inside the female screw thread 42' the end portion of a male screw threaded rod mentioned later will screw through as it opens wider said inside diameter. Incidentally, the piercing hole 50, of the closing block piece 5 brazed on to the lower rim 7's cut ending portion, is made a clearance hole.

The numeral 6 in the drawings designates a male screw made of stainless steel, which comprises a slotted head 60 with a substantially larger diameter than the threaded rod 61 which extends from the slotted head 60, and the slot on the slotted head 60 is formed as a screwdriver slot, and at the circumference of the threaded rod 61 is formed a screw thread which is aligned to said female thread 42 of the above mentioned closing block 4.

Thus, the rim closing block according to the second embodiment is assembled by holding a lense not shown in the drawings by the inner circumferemce of rim 7 and aligning the surface of the closing block 4 and 5, inserting into the also aligned piercing hole 40, 50, the threaded rod 61 of the mail screw 6 from below. As the threded rod 61 is screwed through the female screw 42 of the upper piercing hole 40, the female screw thread 42' inside the split cone projection 41 is also forcefully widened open and the threaded rod end portion 61' is tightly clamped toward the center axis by the spring-back resiliency characteristic to metal materials of said split cone projection 41 made of stainless steel. In this way, said screw is securely prevented from loosening.

Although the concrete embodiments shown by the present specification and drawings as examples of the present invention is as above, it is understood that the present invention is not limited to the afore mentioned embodiments nor drawings at all, and as long as the spirit and the scope of the invention defined by appended claims is not departed, it is possible to suitably change the design according to the concrete needs arising from designing and manufacturing of goods.

For example, early described first embodiment was designed as the screw loosening prevention mechanism for the screw joining temple hinge, and the second embodiment realized the present invention as the screw loosening prevention mechanism for rim closing block, it is obvious that the present invention can be applied to all screwed on parts of eyeglasses. Therefore, it is easy to realize the present invention by providing split cone projection to the exit end side of parts for pad, hood, brace bar, other accessories and attachments where the mail screw's threaded rod end can come out by screwing through the parts.

Also, the split cone projection described before all had four split slots, but as long as the projected cone is vertically split at a regular interval, the number of split slots may be odd number or even number, and in short, it is sufficient to make the split cone projection so that the threaded rod end portion of the male screw can be clamped toward the center of the threaded rod end portion of male screw.

Moreover, in the afore-described embodiments, only German silver and stainless steel as metal materials comprising eyeglasses parts, it is possible to adopt all metal materials which can be adopted to conventional general eyeglasses, for example, pure titanium, nickel-chromium alloy, beryllium-copper alloy, monel metalare naturally used as metal materials for the present invention.

INDUSTRIAL APPLICABILITY

As explained above, the screw loosening prevention mechanism adopting the comprising elements of the present invention is only different from conventional screw on mechanism only in the fact that the split cone projection is provided on the exit side where threaded rod end portion pierces through and at the inner wall of the piercing hole circumference of the split cone projection, female screw thread is formed which gradually reduces in inside diameter as the exit end of the piercing hole approaches, and into this female screw, the threaded rod of the male screw is screwed through as the female screw inside diameter is widened. Therefore, according to the present invention, without increasing the number of the parts which comprises the mechanism, loosening prevention effect is created by strongly clamping the thredded rod end part of the male screw applying the resiliency characteristic of metal materials ingeneously. The present invention is particularly suited to the loosening prevention of the screw on fixing of thin and narrow eyeglasses parts, and because the structure of the mechanism is hardly more complex than the conventional screw on mechanism, it is possible to manufacture the mechanism very inexpensively.

Also, the screw loosening prevention mechanism of the present invention obtained by the present invention uses the resiliency, i.e. spring-back characteristic of metal materials in the split cone portion, it is fully capable of enduring rough use or repeated unscrewing and screwing, its durability being extremely good, it differs greatly form the conventional light duty screw loosening prevention mechanism which coats the thredded rod portion of the male screw with synthetic resin.

Figure 1:
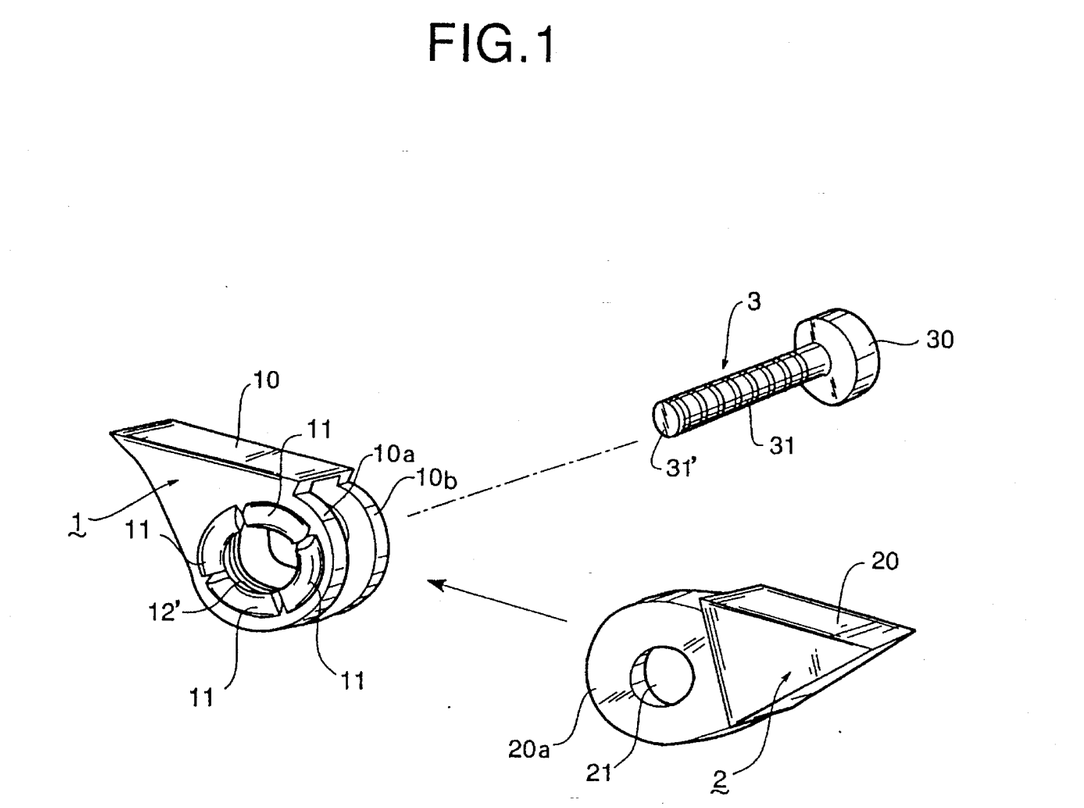
FIG. 1 is a perspective illustration of the disassembled unit according to the first embodiment which applied the present invention to the temple hinge which joines the temple to the front frame of eyeglasses.
Figure 2:
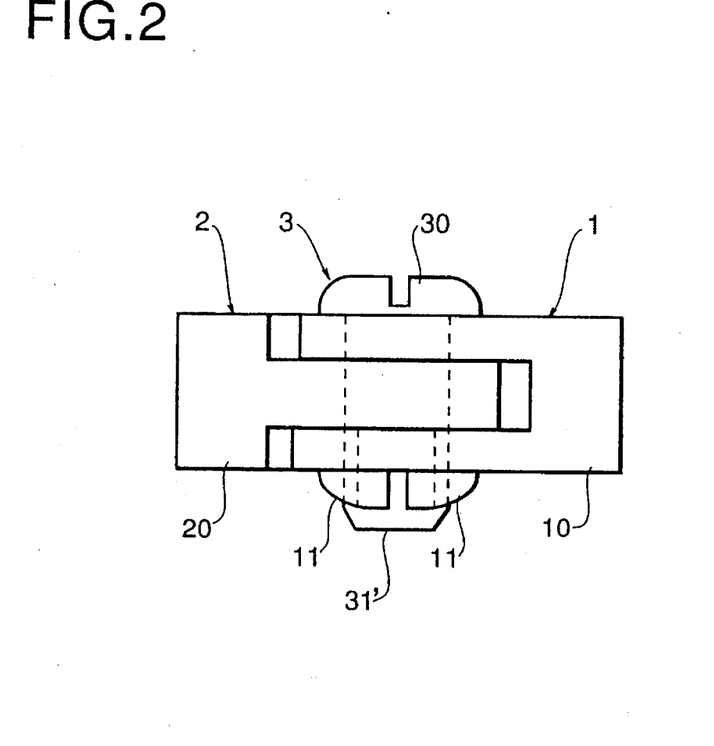
FIG. 2 is an assembled front view of the same.
Figure 3:
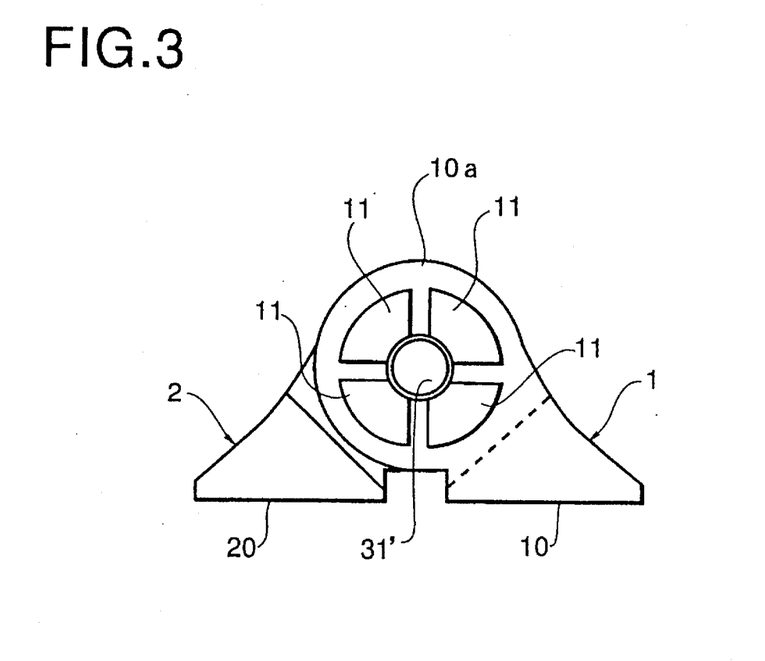
FIG. 3 is a bottom plan view of the same.
Figure 4:
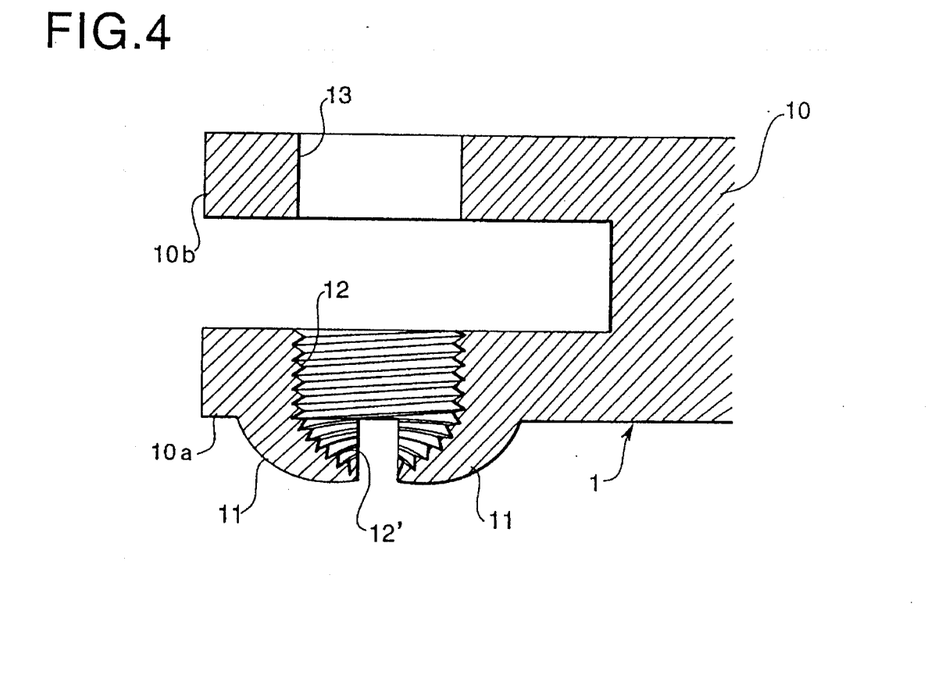
FIG. 4 is a partial enlarged vertical section of the hinge housing with exaggerated illustration of the split cone portion, the hinge housing being a part of the hinge according to the first embodiment.
Figure 5:
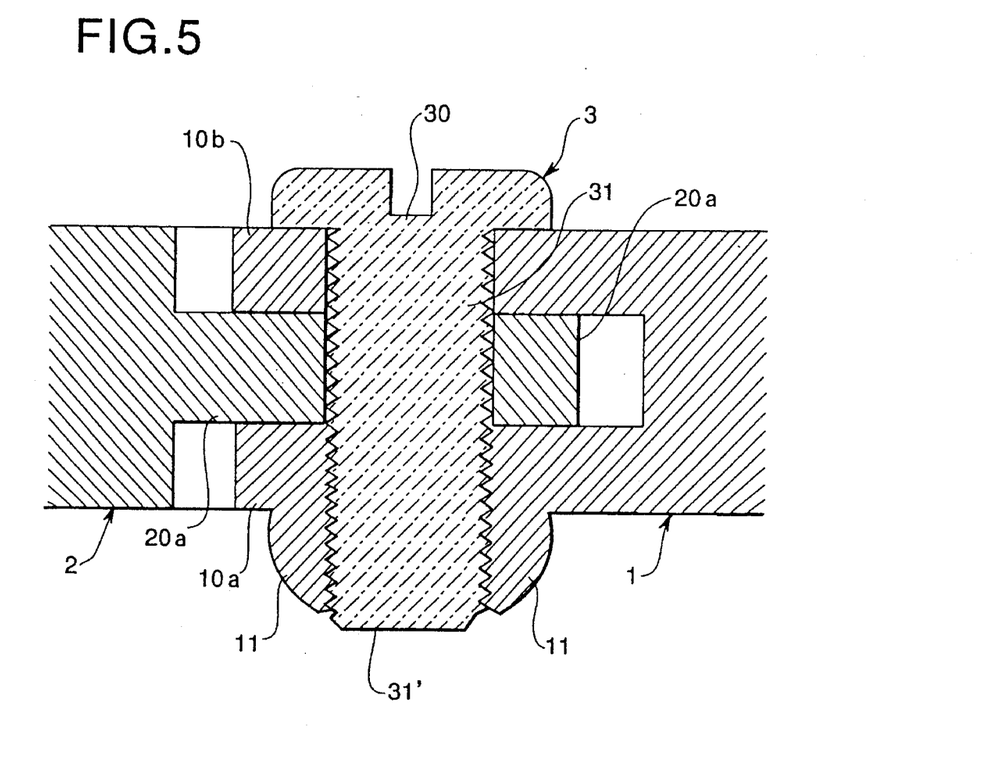
FIG. 5 is a partial enlarged vertical section of the hinge assembly according to the First embodiment.
Figure 6:
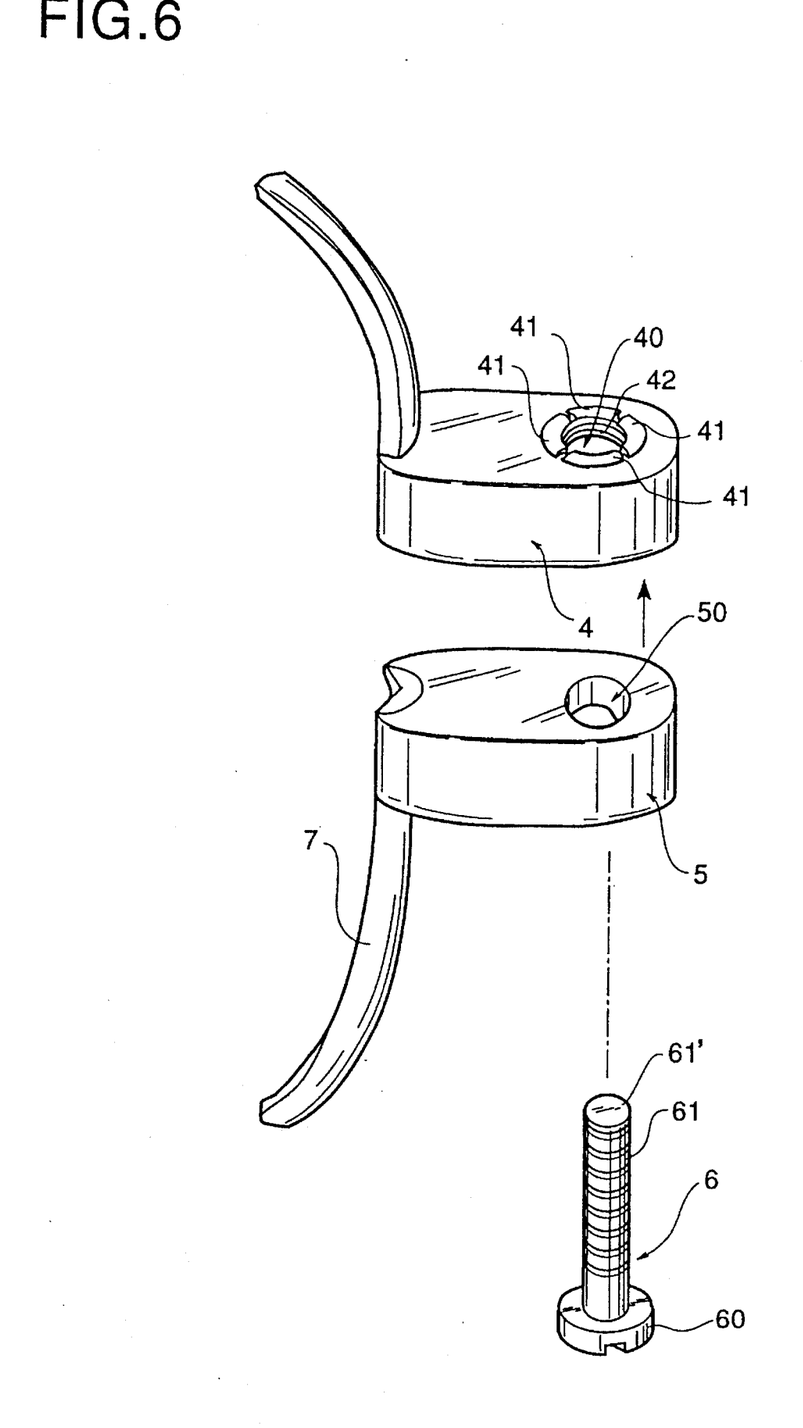
FIG. 6 is a perspective illustration of the disassembled rim closing block according to the second embodiment.
Figure 7:
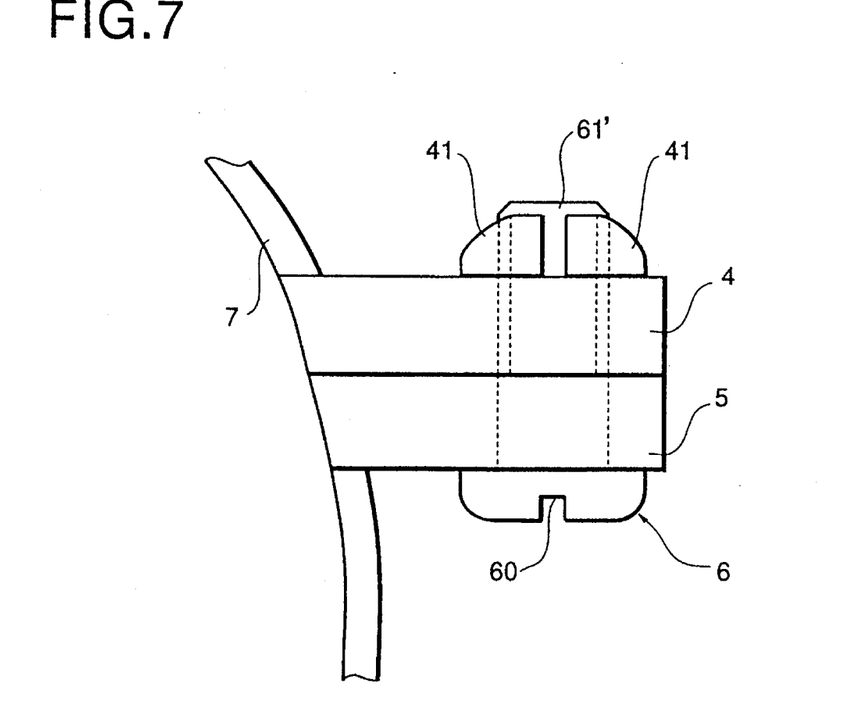
FIG. 7 is an assembled front view of the second embodiment.
Figure 8:
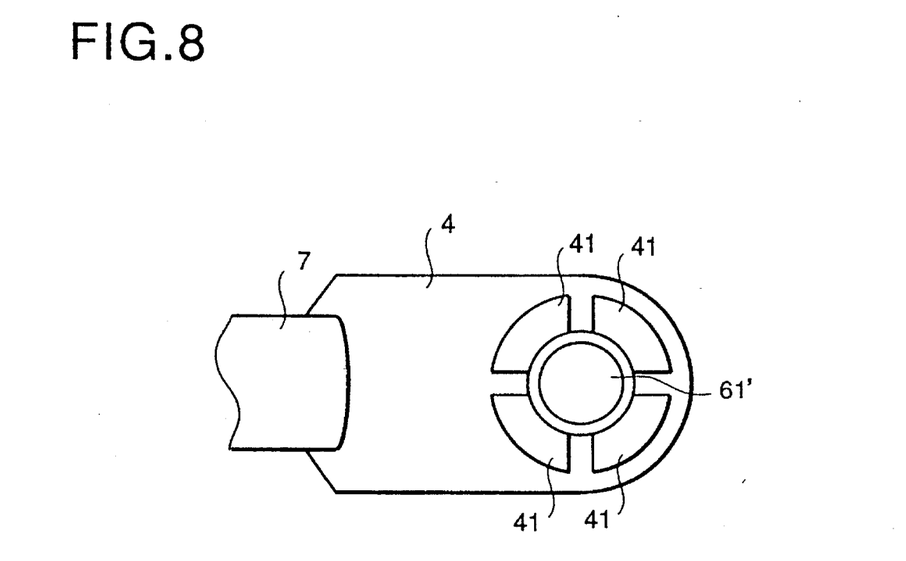
FIG. 8 is a bottom plan view of the same.
Figure 9:
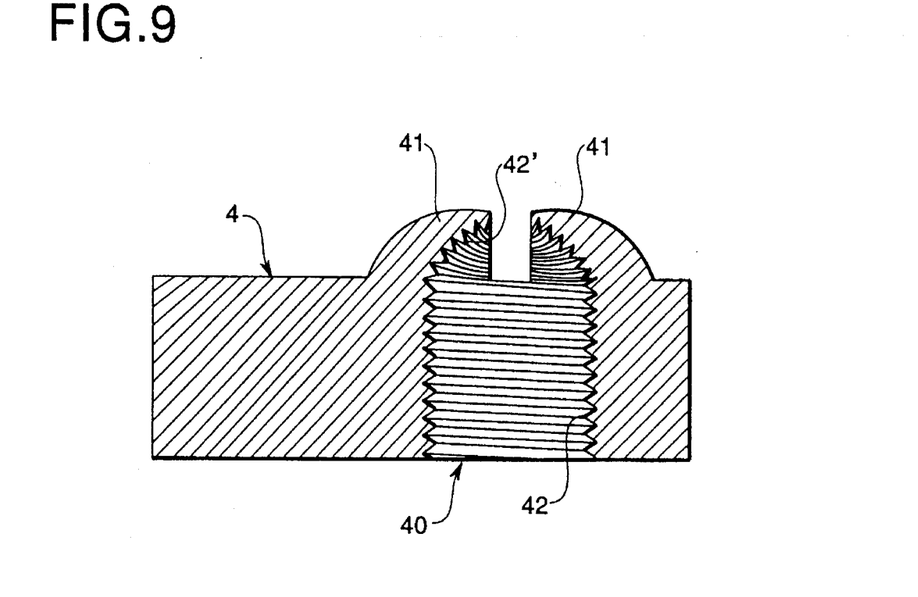
FIG. 9 is a partial enlarged vertical section of the closing block part according to the same second embodiment whereon a split cone portion is formed with exaggerated illustration of the same.
Figure 10:
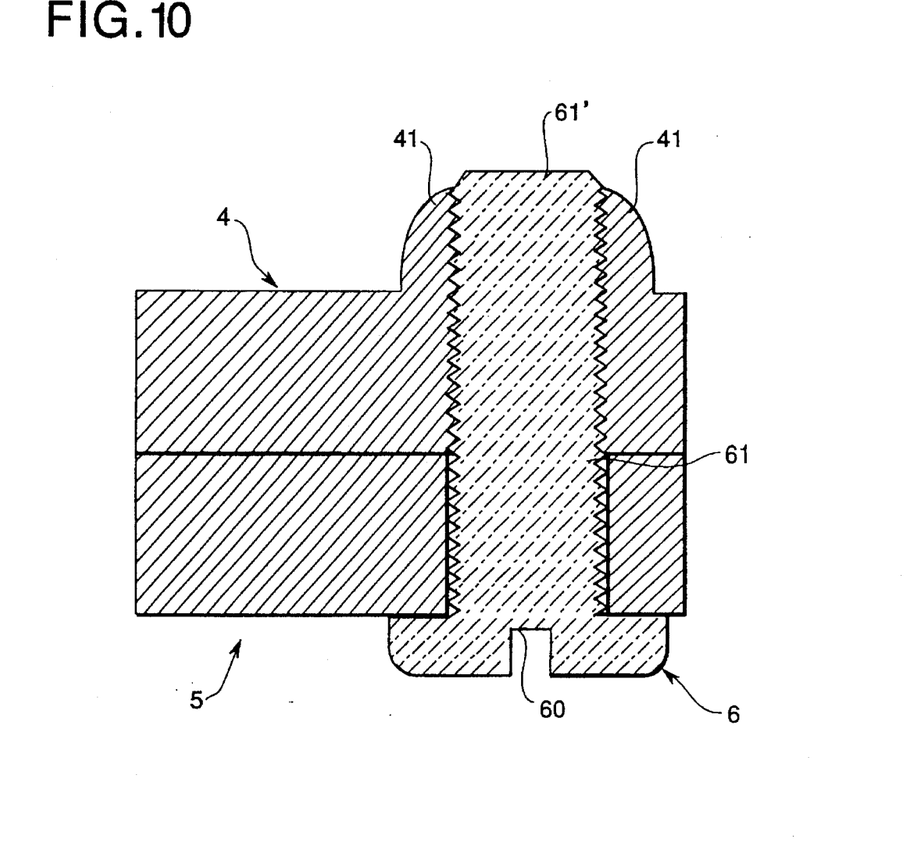
FIG. 10 is a partial enlarged vertical section of the same second embodiment.

Moreover, according to the present invention, the split cone projection which is provided on one of the eyeglasses parts to be joined are vertically split at equal interval of certain angle, the projection gives secure impression from its appearance and capable of stylishly adorning the threaded rod end which projects out from the end portion of fixed eyeglasses parts. This is shown in FIG. 3 or FIG. 8 for example.

Thus, according to the present invention, it is possible to largely resolve the shortcomings of the conventional screw loosening prevention mechanism according to the prior arts which were gaining dissattisfaction of the users, and give quite satisfactory results. Furthermore, the screw loosening prevention mechanism of the new proposal will hardly introduce more complexity in terms of its parts, easily manufacturable and assemblable, the industrial value of the present invention is extremely great.

I claim:

1. A clamp type screw loosening prevention mechanism for eyeglasses parts comprising:

two eyeglasses parts each of which has a piercing hole having an aligned axis, which parts are to be screw-joined to each other; and a male screw which pierces through said piercing holes of said eyeglasses parts and screw-joins the eyeglasses parts; wherein at the outside end surface of one of said eyeglasses parts where an end part of a threaded rod of said male screw is adapted for exiting, a split cone projection is permanently attached, the split cone projection having a bored hole extending therethrough, the bored hole having an exit end away from the outside end surface of said one of said eyeglasses parts, and at an inside wall of the bored hole, a female screw thread is provided which gradually reduces in inside diameter towards the exit end of the bored hole; and the end part of said threaded rod which is screwed into the piercing holes from a side opposite of the split cone projection is firmly joined to said female screw thread inside the split cone projection in a clamped condition by a spring-back resiliency of said split cone projection.

2. A clamp type screw loosening prevention mechanism for eye glasses parts claimed in claim 1, wherein the female screw thread is provided only to the piercing hole of the eyeglasses part on which the split cone projection is provided.

3. A clamp type screw loosening prevention mechanism for eyeglasses parts as claimed in claim 2, wherein the split cone projection is split by the vertical slits which are provided at an interval of equal angle.

4. A clamp type screw loosening prevention mechanism for eyeglasses parts as claimed in claim 2, wherein the eyeglasses parts to be screw-joined are made of metal material.

5. A clamp type screw loosening prevention mechanism for eyeglasses parts as claimed in claim 1, wherein the split cone projection is split by the vertical slits which are provided at an interval of equal angle.

6. A clamp type screw loosening prevention mechanism for eyeglasses parts as claimed in claim 5, wherein the eyeglasses parts to be screw-joined are made of metal material.

7. A clamp type screw loosening prevention mechanism for eyeglasses parts as claimed in claim 1, wherein the eyeglasses parts to be screw-joined are made of metal material.

\* \* \* \* \*

UNITED STATES PATENT AND TRADEMARK OFFICE
CERTIFICATE OF CORRECTION

PATENT NO. : 5,488,440
DATED : January 30, 1996
INVENTOR(S) : Mikihito FUKUOAKA

It is certified that error appears in the above-indentified patent and that said Letters Patent is hereby corrected as shown below:

Column 1, line 62, change "threded" to --threaded--.

Column 3, line 8, change "joines" to --joins--;

Column 3, line 17, change "First" to --first--;

Column 3, line 33, change "Reffering" to --Referring--;

Column 3, line 41, change "traiangular" to --triangular--;

Column 3, line 49, change "descrimbed" to --described--;

Column 4, line 21, change "Reffering" to --Referring--;

Column 4, line 23, change "invnention" to --invention--; and

Column 4, line 60, change "threded" to --threaded--.

Column 5, line 50, change "threded" to --threaded--; and

Column 5, line 64, change "threded" to --threaded--.

UNITED STATES PATENT AND TRADEMARK OFFICE
CERTIFICATE OF CORRECTION

PATENT NO. : 5,488,440
DATED : January 30, 1996
INVENTOR(S) : Mikihito Fukuoaka

It is certified that error appears in the above-indentified patent and that said Letters Patent is hereby corrected as shown below:

Column 6, line 10, change "dissattisfaction" to --dissatisfaction--.

Signed and Sealed this

Twenty-eighth Day of May, 1996

Attest:

BRUCE LEHMAN

*Attesting Officer*     *Commissioner of Patents and Trademarks*